United States Patent
Lin et al.

(10) Patent No.: US 11,356,246 B2
(45) Date of Patent: Jun. 7, 2022

(54) DATA ANALYSIS SYSTEM AND DATA ANALYSIS METHOD

(71) Applicant: PEGATRON CORPORATION, Taipei (TW)

(72) Inventors: Wei-Cheng Lin, Taipei (TW); Pei-Yu Chen, Taipei (TW); Jia-Shiung Yang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 165 days.

(21) Appl. No.: 16/742,801

(22) Filed: Jan. 14, 2020

(65) Prior Publication Data
US 2020/0252200 A1    Aug. 6, 2020

(30) Foreign Application Priority Data

Feb. 1, 2019   (TW) ................................. 108104116

(51) Int. Cl.
*H04L 9/06*       (2006.01)
*H04L 9/14*       (2006.01)

(52) U.S. Cl.
CPC ............ *H04L 9/065* (2013.01); *H04L 9/0618* (2013.01); *H04L 9/14* (2013.01)

(58) Field of Classification Search
CPC .......... H04L 9/065; H04L 9/0618; H04L 9/14
See application file for complete search history.

(56) References Cited

U.S. PATENT DOCUMENTS

| | | | | |
|---|---|---|---|---|
| 2005/0268094 A1* | 12/2005 | Kohan | ................... | G06Q 10/10 713/165 |
| 2012/0166818 A1* | 6/2012 | Orsini | ................... | H04L 9/3231 713/193 |
| 2014/0089657 A1* | 3/2014 | Eguchi | ................ | H04L 63/0428 713/150 |
| 2015/0149362 A1* | 5/2015 | Baum | ................. | G06F 21/6263 705/51 |
| 2017/0126632 A1* | 5/2017 | Wang | ...................... | H04L 67/04 |
| 2017/0207916 A1* | 7/2017 | Luce | ......................... | H04L 9/14 |
| 2018/0048628 A1* | 2/2018 | Soon-Shiong | ........ | H04L 9/3218 |
| 2019/0036678 A1* | 1/2019 | Ahmed | ................... | H04L 9/302 |

FOREIGN PATENT DOCUMENTS

| | | |
|---|---|---|
| CN | 106162625 | 11/2016 |
| CN | 106790074 | 5/2017 |
| CN | 106961449 | 7/2017 |
| TW | 201216664 | 4/2012 |

* cited by examiner

*Primary Examiner* — Ali S Abyaneh
*Assistant Examiner* — Zoha Piyadehghibi Tafaghodi
(74) *Attorney, Agent, or Firm* — J.C. Patents (57) ABSTRACT

The application discloses a data analysis system and a data analysis method. The data analysis system includes a data provider host and a data analysis host. The data provider host is configured to perform a stream cipher algorithm based on raw data to obtain first data. The data analysis host is configured to perform a data analysis based on the first data to obtain an analysis result. The data provider host or the data analysis host is further configured to perform a block cipher algorithm based on the analysis result to obtain second data, and send the second data to an external device. The data provider host is further configured to calculate an attribute-value correspondence between the raw data and the second data, and send the attribute-value correspondence to the external device.

17 Claims, 4 Drawing Sheets

DATA ANALYSIS SYSTEM AND DATA ANALYSIS METHOD

CROSS-REFERENCE TO RELATED APPLICATION

This non-provisional application claims priority under 35 U.S.C. § 119(a) to Patent Application No. 108104116 filed in Taiwan, R.O.C. on Feb. 1, 2019, the entire contents of which are hereby incorporated by reference.

BACKGROUND

Technical Field

The application relates to a data analysis technology, and in particular, to a data analysis system and a data analysis method that can protect privacy.

Related Art

Nowadays, many institutions have various data of users. When needing to analyze the users' data, these institutions usually entrust specialized data analysis companies with the analysis. However, such behaviors lead to privacy problems.

For example, a hospital keep a record of patients' personal data and case histories. When a particular person or organization intending to obtain data such as factors of developing a cancer requests the hospital for cancer-related statistical data, the hospital may need to provide the data to an analysis company for analysis. However, once the hospital provides the data to the analysis company, there is a risk of leakage of the patients' personal data and case histories.

SUMMARY

In view of this, embodiments of the application provide a data analysis system and a data analysis method, to improve the data security while maintaining the flexibility of data analysis.

A data analysis system of an embodiment of the application includes a data provider host and a data analysis host. The data provider host is configured to perform a stream cipher algorithm based on raw data to obtain first data. The data analysis host is coupled to the data provider host, and is configured to perform a data analysis based on the first data to obtain an analysis result. The data provider host or the data analysis host is further configured to perform a block cipher algorithm based on the analysis result to obtain second data, and send the second data to an external device. The data provider host is further configured to calculate an attribute-value correspondence between the raw data and the second data, and send the attribute-value correspondence to the external device.

A data analysis method of an embodiment of the application is applicable to a data analysis system including a data provider host and a data analysis host, and includes the following steps: performing, by the data provider host, a stream cipher algorithm based on raw data to obtain first data, and sending the first data to the data analysis host; performing, by the data analysis host, a data analysis based on the first data to obtain an analysis result; performing, by the data provider host or the data analysis host, a block cipher algorithm based on the analysis result to obtain second data, and sending the second data to an external device; and calculating, by the data provider host, an attribute-value correspondence between the raw data and the second data, and sends the attribute-value correspondence to the external device.

A data analysis method of another embodiment of the application is applicable to a data provider host, and includes the following steps: performing a stream cipher algorithm based on raw data and a first key to obtain first data; sending the first data to a data analysis host, so that the data analysis host performs a data analysis based on the first data to obtain an analysis result; obtaining the analysis result from the data analysis host, and performs a block cipher algorithm based on the analysis result and a second key to obtain second data; calculating an attribute-value correspondence between the raw data and the second data based on the raw data, the first key and the second key; and sending the second data and the attribute-value correspondence to an external device.

A data analysis method of another embodiment of the application is applicable to a data provider host, and includes the following steps: performing a stream cipher algorithm based on raw data and a first key to obtain first data; sending the first data and a second key to a data analysis host, so that the data analysis host performs a data analysis based on the first data to obtain an analysis result, and performs a block cipher algorithm based on the analysis result and the second key to obtain second data; calculating an attribute-value correspondence between the raw data and the second data based on the raw data, the first key and the second key; and sending the attribute-value correspondence to an external device.

To make the aforementioned and other objectives and advantages of the application comprehensible, embodiments are described in detail below with reference to the accompanying drawings.

DETAILED DESCRIPTION OF THE EMBODIMENTS

Figure 1:
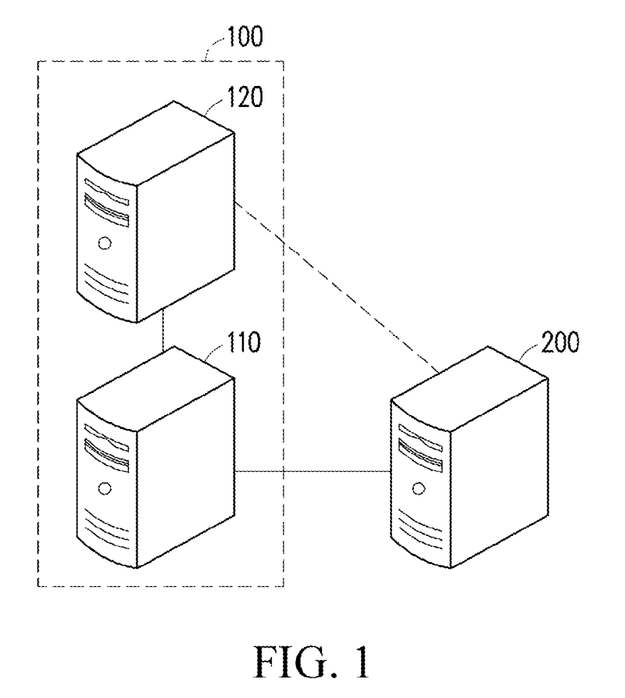
FIG. 1 is a schematic diagram of a data analysis system according to an embodiment of the application.

FIG. 1 is a schematic diagram of a data analysis system according to an embodiment of the application.

Referring to FIG. 1, a data analysis system 100 includes a data provider host 110 and a data analysis host 120 coupled to each other. In some embodiments, the data provider host 110 is a possessor of raw data, for example, a host in a hospital, a bank or other institution, and the data analysis host 120 is an analyst of the data, but the application is not limited thereto.

An external device 200, such as a data user, can directly initiate a request to the data provider host 110 for analyzed data or raw data (for example, purchasing raw data or data analyzed by the data analysis host 120). When receiving the request for analyzed data from the external device 200, the data provider host 110 requests the data analysis host 120 to assist in performing an analysis. Finally, the data provider host 110 or the data analysis host 120 provides the data requested by the external device 200 to the external device 200. It should be noted that, the analysis manner and data items are not limited in the application.

A detailed process of the data analysis performed by the data analysis system is described below through embodiments.

Figure 2:
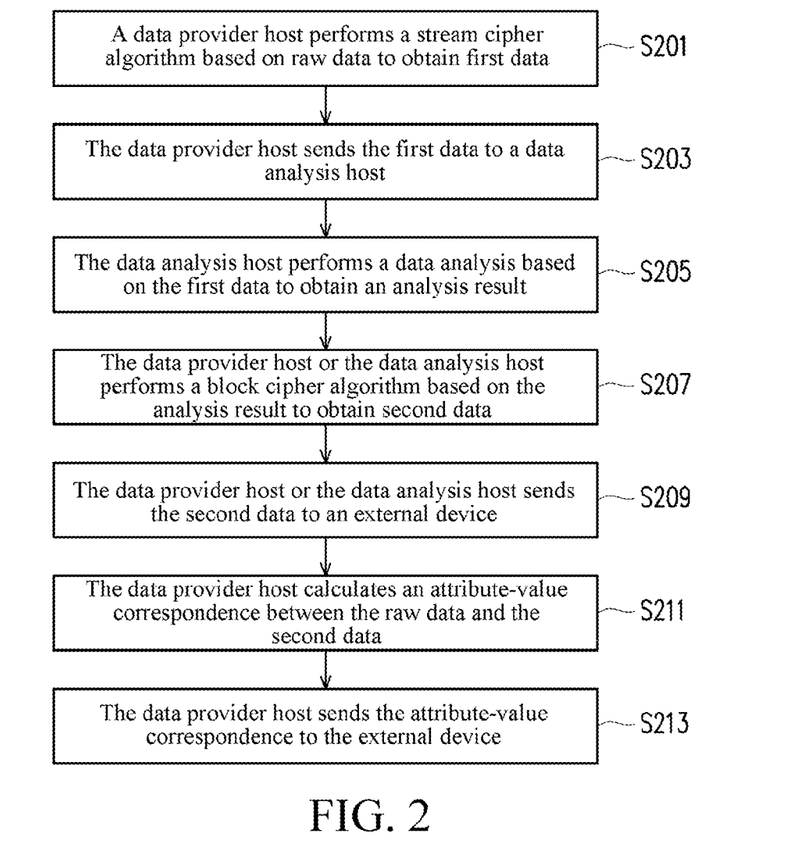
FIG. 2 is a flowchart of a data analysis method according to an embodiment of the application.

FIG. 2 is a flowchart of a data analysis method according to an embodiment of the application.

Referring to FIG. 2, a data provider host 110 performs a stream cipher algorithm based on raw data to obtain first data (step S201), and sends the first data to a data analysis host 120 (step S203).

Specifically, the raw data includes a plurality of attribute values corresponding to a plurality of attributes, and one or more of the plurality of attributes are privacy attributes, that is, attributes that the raw data possessor wants to keep confidential to prevent leakage or disclosure. Therefore, the data provider host 110 performs a stream cipher algorithm on attribute values corresponding to the privacy attributes. Because the stream cipher algorithm provides bit-by-bit encryption, the first data obtained by performing the stream cipher algorithm on the attribute values corresponding to the privacy attributes includes a plurality of first encrypted attribute values corresponding to the privacy attributes.

In addition, the data provider host 110 performs the stream cipher algorithm based on the raw data and the first key, where the first key can be generated based on one of the attributes in the raw data. However, the application is not limited thereto, and a person of ordinary skill in the art can arbitrarily set the first key according to requirements.

In this embodiment, the data provider host 100 is a host in a hospital, and part of the raw data stored therein is shown in Table 1.

TABLE 1

| Date | Patient Identifier | Diagnosis Number |
|---|---|---|
| 2018 Sep. 7 | AA | 010 2591 5566 55 |
| 2018 Sep. 7 | BB | 029 3842 5566 66 |
| 2018 Sep. 8 | AA | 032 7541 5566 56 |
| 2018 Sep. 8 | BB | 029 2552 5566 65 |
| 2018 Sep. 9 | CC | 010 5592 5566 77 |
| 2018 Sep. 9 | CC | 010 5592 5566 78 |

In this embodiment, the raw data includes attribute values corresponding to attributes such as "Date", "Patient Identifier", "Outpatient Department" and "Gender". In Table 1, the first three bits of the diagnosis number is the attribute "Outpatient Department", with an attribute value "010" representing Psychiatry, an attribute value "029" representing Surgery, and an attribute value "032" representing Brain Neurology. In addition, the seventh bit of the diagnosis number is the attribute "Gender", with an attribute value "1" representing male, and an attribute value "2" representing female. Other bits of the diagnosis number are used to represent different attributes. For the brevity of description, details are not described herein. For example, among the attributes of the raw data, "Outpatient Department" and "Gender" are privacy attributes, and "Date" and "Patient Identifier" are non-privacy attributes, but the application is not limited thereto.

In this embodiment, the hospital intends to protect data in the diagnosis number from leakage, and therefore the attributes recorded in the diagnosis number are determined as privacy attributes. The data provider host 100 performs the stream cipher algorithm on the diagnosis number in the raw data by using the first key, and the first key is generated according to the attribute "Date". In other words, if attribute values corresponding to "Date" are the same, the first keys used are also the same. For example, for a diagnosis number "010 2591 5566 55" and a diagnosis number "029 3842 5566 66" on the same date "2018/09/07", the stream cipher algorithm is performed by using the same first key; for a diagnosis number "010 2591 5566 55" on the date "2018/09/07" and a diagnosis number "032 7541 5566 56" on the date "2018/09/08", the stream cipher algorithm is performed by using different first keys.

In this way, for diagnosis numbers in different time ranges, the stream cipher algorithm is also performed by using different first keys, to prevent people from gaining the raw data through brute-force cracking after obtaining a large amount of first data. In other embodiments, the first key may alternatively be generated according to other attributes or at random, but the application is not limited thereto. In other words, for the data provider host 110, the data analysis host 120 and the external device 200 in this embodiment, only the data provider host 110 knows the first key.

In this embodiment, the first data obtained by performing the stream cipher algorithm based on the raw data in Table 1 and the first key is shown in Table 2.

TABLE 2

| Date | Patient Identifier | Diagnosis Number after Performing the Stream Cipher |
|---|---|---|
| 2018 Sep. 7 | AA | 140 0739 6872 88 |
| 2018 Sep. 7 | BB | 159 1080 6872 99 |
| 2018 Sep. 8 | AA | 129 2286 0802 91 |
| 2018 Sep. 8 | BB | 116 7297 0802 00 |
| 2018 Sep. 9 | CC | 214 0712 8581 39 |
| 2018 Sep. 9 | CC | 214 0712 8581 30 |

In this embodiment, the first data at least includes first encrypted attribute values corresponding to two attributes "Outpatient Department" and "Gender". For the date "2018/09/07", the attribute value "010" corresponding to the attribute "Outpatient Department" is encrypted by using the first key to obtain a first encrypted attribute value "140", and the attribute value "029" corresponding to the attribute "Outpatient Department" is encrypted by using the first key into a first encrypted attribute value "159"; for the date "2018/09/08", the attribute value "032" corresponding to the attribute "Outpatient Department" is encrypted by using the first key into a first encrypted attribute value "129", and the attribute value "029" corresponding to the attribute "Outpatient Department" is encrypted by using the first key into a first encrypted attribute value "116". The rest may be deduced by analogy.

It should be noted that, because the first key is associated with the date, the same attribute values corresponding to different dates are encrypted into different first encrypted attribute values, thereby improving data security. In addition, based on properties of the stream cipher algorithm, the same data segments in the raw data and the first data still correspond to the same attributes. For example, the first three bits of the diagnosis number in the raw data correspond to "Outpatient Department" in the privacy attributes, and the first three bits of the encrypted diagnosis number in the raw data also correspond to "Outpatient Department" in the privacy attributes. Similarly, the seventh bit of the diagnosis number in the raw data corresponds to "Gender" in the privacy attributes, and the seventh bit of the encrypted diagnosis number in the first data also corresponds to "Gender" in the privacy attributes. Therefore, even if the data analysis host 120 does not know meanings actually represented by the first encrypted attribute values, the data analysis host 120 can analyze each attribute, thereby ensuring reliable data security and maintaining the flexibility of data analysis.

After the data analysis host 120 receives the first data, the data analysis host 120 performs a data analysis based on the first data to obtain an analysis result (step S205).

In this embodiment, for example, the external device 200 purchases the number of patients and the gender ratio of outpatient department "Psychiatry" on the date 2018/09/07 from the data provider host 110. Therefore, for example, the data provider host 110 requests the data analysis host 120 to assist in analyzing the number of patients and the gender ratio of each outpatient department on the date 2018/09/07.

In this embodiment, the analysis result obtained by the data analysis host 120 is shown in Table 3.

TABLE 3

| Outpatient Department | Numbers | Gender "9" | Gender "0" |
|---|---|---|---|
| 140 | 302 | 56% | 44% |
| 159 | 72 | 33% | 67% |

As shown in Table 3, the data analysis host 120 analyzes a plurality of first encrypted attribute values in the first data, and the obtained analysis result includes one or more of the plurality of first encrypted attribute values and a plurality of pieces of statistical data. Specifically, in the analysis result in Table 3, the number of patients in the outpatient department corresponding to the first encrypted attribute value of "140" is 302, the gender ratio corresponding to a first encrypted attribute value of "9" is 56%, and the gender ratio corresponding to a first encrypted attribute value of "0" is 44%. The number of patients in the outpatient department corresponding to the first encrypted attribute value of "159" is 72, the gender ratio corresponding to the first encrypted attribute value of "9" is 33%, and the gender ratio corresponding to the first encrypted attribute value of "0" is 67%.

For the data analysis host 120, the analysis result of Table 3 is useless when the meanings represented by the first encrypted attribute values are unknown. For example, the data analysis host 120 can only learn that the number of patients in one outpatient department is 302, and the ratio of two genders is 56:44, but the data analysis host 120 cannot determine the outpatient department to which the data corresponds, and which gender corresponds to a higher percentage.

Then, the data provider host 110 or the data analysis host 120 performs a block cipher algorithm based on the analysis result to obtain second data (step S207), and then provides the second data to an external device 200 (step S209).

Specifically, the data provider host 110 or the data analysis host 120 performs the block cipher algorithm based on the analysis result and a second key. Similar to the first key, the second key may also be generated based on one of the attributes in the raw data (for example, date). However, the application is not limited thereto, and a person of ordinary skill in the art may arbitrarily set the second key according to requirements.

In this embodiment, when the block cipher algorithm is performed on the analysis result, the statistical data in the analysis result is maintained, and the block cipher algorithm is performed on the first encrypted attribute values in the analysis result, to further improve the security. The second data obtained by performing the block cipher algorithm based on the analysis result of Table 3 is shown in Table 4.

TABLE 4

| Outpatient Department | Number | Gender "24323 47c283e9f 4975f6cc2 d36a33d3c" | Gender "bce2f b4685902c 147c37d7e 1be591044" |
|---|---|---|---|
| 6f0ffd8d31f28a3a c667e97701997292 | 302 | 56% | 44% |
| 35b332d6d1268c185 377ab452da846c8 | 72 | 33% | 67% |

In this embodiment, the second data includes a plurality of second encrypted attribute values corresponding to the first encrypted attribute values and a plurality of pieces of statistical data. Specifically, the statistical data in the analysis result is maintained, the first encrypted attribute value of "140" corresponding to the outpatient department is encrypted by using the second key into a 32-bit second encrypted attribute value of "6f0ffd8d31 f28a3ac667 e9770f9972 92", the first encrypted attribute value of "159" corresponding to the outpatient department is encrypted by using the second key into a 32-bit second encrypted attribute value of "35b332d6d1 268c185377 ab452da846 c8", the first encrypted attribute value of "9" corresponding to the outpatient department is encrypted by using the second key into a 32-bit second encrypted attribute value of "2432347c28 3e9f4975f6 cc2d36a33d 3c", and the first encrypted attribute value of "0" corresponding to the outpatient department is encrypted by using the second key into a 32-bit second encrypted attribute value of "bce2fb4685 902c147c37 d7e1be5910 44".

According to the above examples, based on the properties of the block cipher algorithm, regardless of the numbers of bits of the first encrypted attribute values in the first data, the numbers of bits of the second encrypted attribute values obtained by the block cipher are the same. Therefore, compared with the bit-by-bit encryption of the stream cipher algorithm, the second data obtained by the block cipher is completely disrupted and harder to be cracked.

Particularly, in this embodiment, regardless of whether the block cipher algorithm is performed on the analysis result by the data provider host 110 or the data analysis host 120, the data provider host 110 knows the second key.

The external device 200 that receives the second data has not obtained the requested data, that is, the number of patients and the gender ratio of the outpatient department of "Psychiatry". Therefore, the data provider host 110 calculates an attribute-value correspondence between the raw data and the second data (step S211), and then provides the attribute-value correspondence to the external device 200 (step S213). Specifically, the attribute-value correspondence includes a correspondence between the second encrypted attribute values in the second data and the attribute values in the raw data, and/or actual meanings of the second encrypted attribute values.

Therefore, the data provider host 110 calculates the attribute-value correspondence between the raw data and the second data based on a request from the external device 200, and provides the attribute-value correspondence to the external device 200. In this way, the external device 200 can obtain the required data from the second data and the attribute-value correspondence from the data provider host 110.

In this embodiment, the data purchased by the external device 200 from the data provider host 110 is the number of patients and the gender ratio of the outpatient department of "Psychiatry". Therefore, after performing the stream cipher algorithm on the attribute value "010" corresponding to the outpatient department by using the first key, the data provider host 110 further performs the block cipher algorithm by using the second key to obtain a second encrypted attribute value "6f0ffd8d31 f28a3ac667 e9770f9972 92"; after performing the stream cipher algorithm on the attribute value "1" corresponding to the gender by using the first key, the data provider host 110 further performs the block cipher algorithm by using the second key to obtain a second encrypted attribute value "2432347c28 3e9f4975f6 cc2d36a33d 3c"; after performing the stream cipher algorithm on the attribute value "2" corresponding to the gender by using the first key, the data provider host 110 further performs the block cipher algorithm by using the second key to obtain a second encrypted attribute value "bce2fb4685 902c147c37 d7e1be5910 44", thus obtaining an attribute-value correspondence as shown in Table 5.

TABLE 5

| Second Encrypted Attribute Values | Actual Meaning |
| --- | --- |
| 6f0ffd8d31f28a3ac667e9770f997292 | Psychiatry |
| 2432347c283e9f4975f6cc2d36a33d3c | Male |
| bce2fb4685902c147c37d7e1be591044 | Female |

After obtaining the attribute-value correspondence, the external device 200 can obtain the required data based on the second data and the attribute-value correspondence. In addition, if needing more other data, the external device 200 may purchase the data from the data provider host 110. For example, if the external device 200 additionally purchases the number of patients and the gender ratio of the outpatient department of "Surgery" from the data provider host 110, the data provider host 110 may calculate an attribute-value correspondence as shown in Table 6 between the raw data and the second data based on the request from the external device, and provide the attribute-value correspondence to the external device 200.

TABLE 6

| Second Encrypted Attribute Values | Actual Meaning |
| --- | --- |
| 35b332d6d1268c185377ab452da846c8 | Surgery |
| 2432347c283e9f4975f6cc2d36a33d3c | Male |
| bce2fb4685902c147c37d7e1be591044 | Female |

According to the data analysis method described above, the data provider host 110, the data analysis host 120 and the external device 200 can respectively obtain the required data, and protect the privacy of data. Based on actual situations, the information exchanged between the data provider host 110, the data analysis host 120 and the external device 200 may be different.

Several embodiments are provided below to describe the information exchanged between the three parties. Details such as specific methods for encrypting and analyzing the data have been described in the foregoing embodiments, and therefore will not be described again in the following embodiments.

Figure 3:
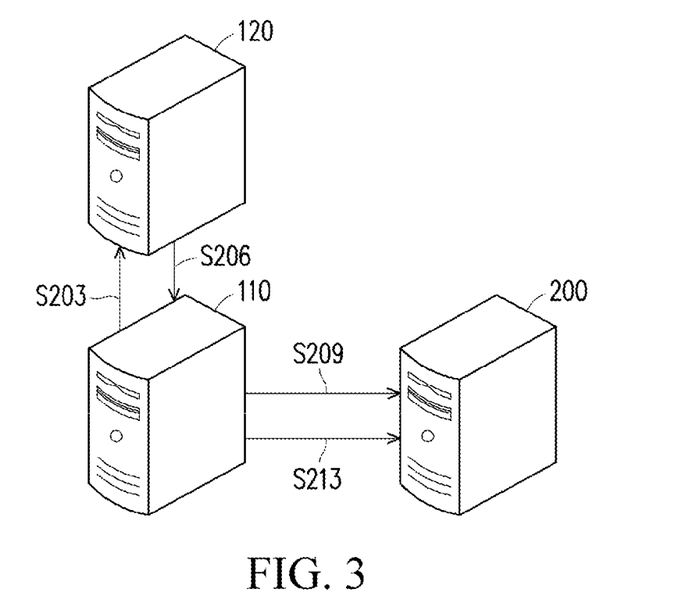
FIG. 3 is a schematic diagram of a data analysis method according to a first embodiment of the application.

FIG. 3 is a schematic diagram of a data analysis method according to a first embodiment of the application.

Referring to FIG. 1, FIG. 2 and FIG. 3, in this embodiment, in the process of the data analysis method, only the data provider host 110 knows the first key and the second key.

First, the data provider host 110 performs a stream cipher algorithm based on raw data and the first key to obtain first data (step S201), and sends the first data to the data analysis host 120 (step S203).

Then, the data analysis host 120 performs a data analysis based on the first data to obtain an analysis result (step S205), and returns the analysis result to the data provider host 110 (step S206).

Afterward, the data provider host 110 performs a block cipher algorithm based on the analysis result and the second key to obtain second data (step S207), and then sends the second data to the external device 200 (step S209). In addition, the data provider host 110 further calculates an attribute-value correspondence between the raw data and the second data based on the raw data, the first key and the second key (step S211), and then sends the attribute-value correspondence to the external device 200 (step S213).

Figure 4:
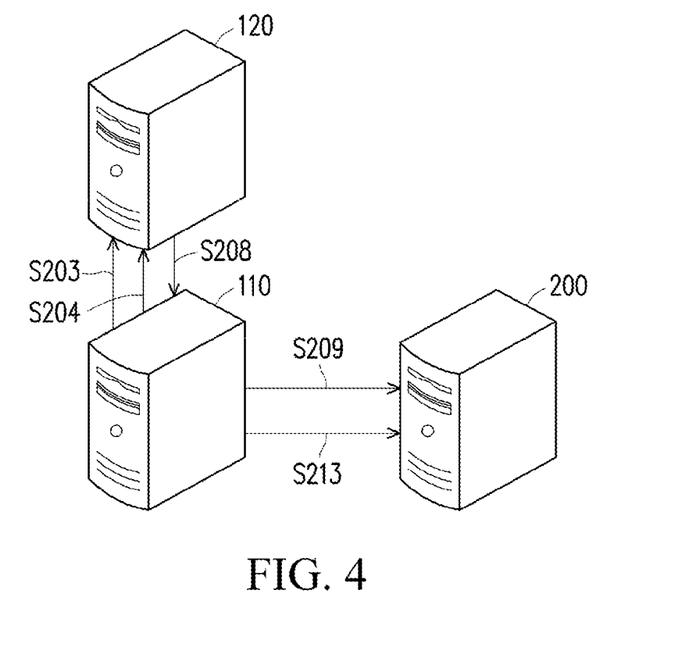
FIG. 4 is a flowchart of a data analysis method according to a second embodiment of the application.

FIG. 4 is a flowchart of a data analysis method according to a second embodiment of the application.

Referring to FIG. 1, FIG. 2 and FIG. 4, in this embodiment, in the process of the data analysis method, only the data provider host 110 knows the first key, and the data analysis host 120 obtains the second key from the data provider host 110.

First, the data provider host 110 performs a stream cipher algorithm based on raw data and the first key to obtain first data (step S201), sends the first data to the data analysis host 120 (step S203), and sends a second key to the data analysis host 120 (step S204).

Then, the data analysis host 120 performs a data analysis based on the first data to obtain an analysis result (step S205), performs a block cipher algorithm based on the analysis result and the second key to obtain second data (step S207), and then returns the second data to the data provider host 110 (step S208).

Afterward, the data provider host 110 sends the second data to the external device 200 (step S209). In addition, the data provider host 110 further calculates an attribute-value correspondence between the raw data and the second data based on the raw data, the first key and the second key (step S211), and then sends the attribute-value correspondence to the external device 200 (step S213).

Figure 5:
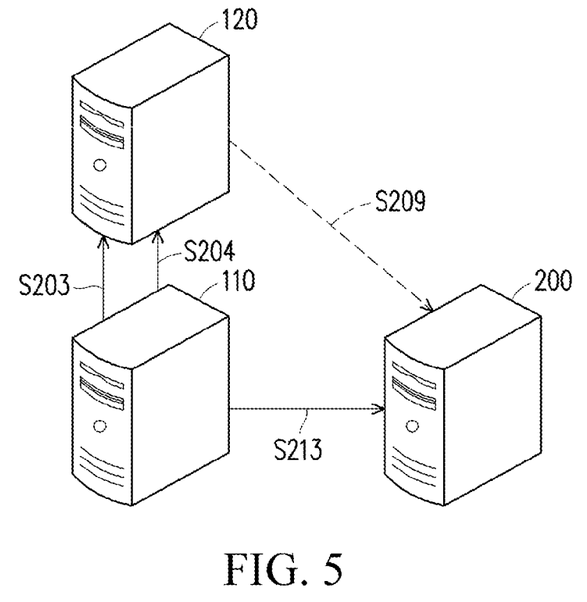
FIG. 5 is a schematic diagram of a data analysis method according to a third embodiment of the application.

FIG. 5 is a schematic diagram of a data analysis method according to a third embodiment of the application.

Referring to FIG. 1, FIG. 2 and FIG. 5, in this embodiment, in the process of the data analysis method, only the data provider host 110 knows the first key, and the data analysis host 120 obtains the second key from the data provider host 110. In addition, the data analysis host 120 and the external device 200 can communicate with each other.

First, the data provider host 110 performs a stream cipher algorithm based on raw data and the first key to obtain first data (step S201), sends the first data to the data analysis host 120 (step S203), and sends the second key to the data analysis host 120 (step S204).

Then, the data analysis host 120 performs a data analysis based on the first data to obtain an analysis result (step S205), performs a block cipher algorithm based on the analysis result and the second key to obtain second data (step S207), and then sends the second data to the external device 200 (step S209).

In addition, the data provider host 110 calculates an attribute-value correspondence between the raw data and the second data based on the raw data, the first key and the second key (step S211), and then sends the attribute-value correspondence to the external device 200 (step S213).

Based on the above, according to the data analysis system and the data analysis method provided by the embodiments of the application, the data provider host first performs a stream cipher on the raw data, and then sends the encrypted data to the data analysis host for analysis; then the data provider host or the data analysis host performs a block cipher on the analysis result, and sends the encrypted analysis result to the external device. In addition, the data provider host further send the attribute-value correspondence to the external device, so that the external device can obtain the required data based on the received analysis result and attribute-value correspondence. In this way, the privacy and security of the raw data can be improved, and the data analysis host can also collect statistics on items to be analyzed, thereby maintaining the flexibility of analysis.

Although the application has been disclosed above through the embodiments, the embodiments are not intended to limit the application. Any person of ordinary skill in the art can make some variations or modifications without departing from the spirit and scope of the application. Therefore, the protection scope of the application shall be subject to the appended claims.

What is claimed is:

1. A data analysis system, comprising:
a data provider host, configured to perform a stream cipher algorithm based on raw data to obtain first data; and
a data analysis host, coupled to the data provider host, and configured to perform a data analysis based on the first data to obtain an analysis result,
wherein the data provider host or the data analysis host is further configured to perform a block cipher algorithm based on the analysis result to obtain second data, and send the second data to an external device, the data provider host is further configured to calculate an attribute-value correspondence between the raw data and the second data, and sends the attribute-value correspondence to the external device,
wherein the raw data comprises a plurality of attribute values corresponding to a plurality of attributes,
wherein the first data comprises a plurality of first encrypted attribute values corresponding to a plurality of privacy attributes in the attributes, the analysis result comprises the first encrypted attribute values and a plurality of pieces of statistical data, the second data comprises a plurality of second encrypted attribute values and the statistical data, and the attribute-value correspondence comprises a correspondence between the second encrypted attribute values and the attribute values,
wherein the second encrypted attribute values corresponding to the first encrypted attribute values.

2. The data analysis system according to claim 1, wherein the data provider host performs the stream cipher algorithm based on the raw data and a first key, the data provider host or the data analysis host performs the block cipher algorithm based on the analysis result and a second key, and the data provider host calculates the attribute-value correspondence between the raw data and the second data based on the raw data, the first key and the second key.

3. The data analysis system according to claim 2, wherein the data provider host further sends the first data and the second key to the data analysis host.

4. The data analysis system according to claim 3, wherein at least one of the first key and the second key is generated based on one of the attributes.

5. The data analysis system according to claim 1, wherein the first encrypted attribute values are generated based on the attribute values corresponding to the privacy attributes and the first key, and the second encrypted attribute values are generated based on the first encrypted attribute values in the analysis result and the second key.

6. A data analysis method, applicable to a data analysis system comprising a data provider host and a data analysis host, the data analysis method comprising:
performing, by the data provider host, a stream cipher algorithm based on raw data to obtain first data, and sending the first data to the data analysis host;
performing, by the data analysis host, a data analysis based on the first data to obtain an analysis result;
performing, by the data provider host or the data analysis host, a block cipher algorithm based on the analysis result to obtain second data, and sending the second data to an external device, and
calculating, by the data provider host, an attribute-value correspondence between the raw data and the second data, and sending the attribute-value correspondence to the external device,
wherein the raw data comprises a plurality of attribute values corresponding to a plurality of attributes,
wherein the first data comprises a plurality of first encrypted attribute values corresponding to a plurality of privacy attributes in the attributes, the analysis result comprises the first encrypted attribute values and a plurality of pieces of statistical data, the second data comprises a plurality of second encrypted attribute values and the statistical data, and the attribute-value correspondence comprises a correspondence between the second encrypted attribute values and the attribute values,
wherein the second encrypted attribute values corresponding to the first encrypted attribute values.

7. The data analysis method according to claim 6, wherein the data provider host performs the stream cipher algorithm based on the raw data and a first key, the data provider host or the data analysis host performs the block cipher algorithm based on the analysis result and a second key, and the data provider host calculates the attribute-value correspondence between the raw data and the second data based on the raw data, the first key and the second key.

8. The data analysis method according to claim 7, further comprising:
sending, by the data provider host, the second key to the data analysis host.

9. The data analysis method according to claim 8, wherein at least one of the first key and the second key is generated based on one of the attributes.

10. The data analysis method according to claim 6, wherein the first encrypted attribute values are generated based on the attribute values corresponding to the privacy attributes and the first key, and the second encrypted attribute values are generated based on the first encrypted attribute values in the analysis result and the second key.

11. A data analysis method, applicable to a data provider host, the data analysis method comprising:
performing a stream cipher algorithm based on raw data and a first key to obtain first data;
sending the first data to a data analysis host, so that the data analysis host performs a data analysis based on the first data to obtain an analysis result;

obtaining the analysis result from the data analysis host, and performing a block cipher algorithm based on the analysis result and a second key to obtain second data;

calculating an attribute-value correspondence between the raw data and the second data based on the raw data, the first key and the second key; and sending the second data and the attribute-value correspondence to an external device, wherein the raw data comprises a plurality of attribute values corresponding to a plurality of attributes, wherein the first data comprises a plurality of first encrypted attribute values corresponding to a plurality of privacy attributes in the attributes, the analysis result comprises the first encrypted attribute values and a plurality of pieces of statistical data, the second data comprises a plurality of second encrypted attribute values and the statistical data, and the attribute-value correspondence comprises a correspondence between the second encrypted attribute values and the attribute values, wherein the second encrypted attribute values corresponding to the first encrypted attribute values.

12. The data analysis method according to claim 11, wherein at least one of the first key and the second key is generated based on one of the attributes.

13. The data analysis method according to claim 11, wherein the first encrypted attribute values are generated based on the attribute values corresponding to the privacy attributes and the first key, and the second encrypted attribute values are generated based on the first encrypted attribute values in the analysis result and the second key.

14. A data analysis method, applicable to a data provider host, the data analysis method comprising:

performing a stream cipher algorithm based on raw data and a first key to obtain first data;

sending the first data and a second key to a data analysis host, so that the data analysis host performs a data analysis based on the first data to obtain an analysis result, and performs a block cipher algorithm based on the analysis result and the second key to obtain second data;

calculating an attribute-value correspondence between the raw data and the second data based on the raw data, the first key and the second key; and sending the attribute-value correspondence to an external device, wherein the raw data comprises a plurality of attribute values corresponding to a plurality of attributes, wherein the first data comprises a plurality of first encrypted attribute values corresponding to a plurality of privacy attributes in the attributes, the analysis result comprises the first encrypted attribute values and a plurality of pieces of statistical data, the second data comprises a plurality of second encrypted attribute values and the statistical data, and the attribute-value correspondence comprises a correspondence between the second encrypted attribute values and the attribute values, wherein the second encrypted attribute values corresponding to the first encrypted attribute values.

15. The data analysis method according to claim 14, further comprising:

receiving the second data from the data analysis host, and sending the second data to the external device.

16. The data analysis method according to claim 15, wherein at least one of the first key and the second key is generated based on one of the attributes.

17. The data analysis method according to claim 14, wherein the first encrypted attribute values are generated based on the attribute values corresponding to the privacy attributes and the first key, and the second encrypted attribute values are generated based on the first encrypted attribute values in the analysis result and the second key.

* * * * *